(12) United States Patent
Wenig et al.

(10) Patent No.: US 9,207,955 B2
(45) Date of Patent: Dec. 8, 2015

(54) DYNAMICALLY CONFIGURABLE SESSION AGENT

(71) Applicant: INTERNATIONAL BUSINESS MACHINES CORPORATION, Armonk, NY (US)

(72) Inventors: Robert I. Wenig, Mill Valley, CA (US); Manoj Punjabi, Dublin, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/516,478

(22) Filed: Oct. 16, 2014

(65) Prior Publication Data
US 2015/0058616 A1 Feb. 26, 2015

Related U.S. Application Data

(60) Division of application No. 13/972,776, filed on Aug. 21, 2013, which is a division of application No. 12/904,356, filed on Oct. 14, 2010, now Pat. No. 8,583,772, which is a continuation of application No. 12/191,585, filed on Aug. 14, 2008, now Pat. No. 8,949,406.

(60) Provisional application No. 61/332,498, filed on May 7, 2010.

(51) Int. Cl.
*G06F 15/173* (2006.01)
*G06F 15/16* (2006.01)
*G06F 17/00* (2006.01)
(Continued)

(52) U.S. Cl.
CPC ............ *G06F 9/44505* (2013.01); *G06F 9/542* (2013.01); *G06F 11/3409* (2013.01); *G06F 11/3438* (2013.01); *G06F 11/3495* (2013.01); *G06Q 30/02* (2013.01); *H04L 41/0213* (2013.01); *H04L 67/04* (2013.01); *H04L 67/14* (2013.01); *H04L 67/142* (2013.01); *H04L 67/22* (2013.01); *H04L 67/306* (2013.01);
(Continued)

(58) Field of Classification Search
CPC ...................................................... G06F 9/542
See application file for complete search history.

(56) References Cited

U.S. PATENT DOCUMENTS

| 5,463,547 | A | 10/1995 | Markowitz |
| 5,564,043 | A | 10/1996 | Siefert |

(Continued)

FOREIGN PATENT DOCUMENTS

| CA | 2656539 A1 | 2/2008 |
| CA | 2696884 A1 | 3/2009 |

(Continued)

OTHER PUBLICATIONS

Bishop, Matt et al., "A Model of Security Monitoring", Department of Mathematics and Computer Science, Dartmouth College, pp. 46-52. Dec. 1989.

(Continued)

*Primary Examiner* — Alan Chen
(74) *Attorney, Agent, or Firm* — Stolowitz Ford Cowger LLP

(57) ABSTRACT

A monitoring system captures the behavior of distributed applications and also provides a framework for augmenting functionality of the application in response to user interactions and different states of the application and network. Network events exchanged between an application and an application server are captured and the local client events on the client device are also selectively captured. The different disparate network events and client events are then combined together during a replay operation to simulate the user experience during the previous application session.

17 Claims, 9 Drawing Sheets

(51) Int. Cl.

| | |
|---|---|
| *G06F 3/00* | (2006.01) |
| *G06F 9/445* | (2006.01) |
| *G06F 11/34* | (2006.01) |
| *G06Q 30/02* | (2012.01) |
| *H04L 29/08* | (2006.01) |
| *H04L 12/24* | (2006.01) |
| *G06F 9/54* | (2006.01) |
| *H04L 29/06* | (2006.01) |

(52) U.S. Cl.
CPC ....... *G06F2201/86* (2013.01); *G06F 2201/875* (2013.01); *H04L 67/40* (2013.01)

(56) References Cited

U.S. PATENT DOCUMENTS

| | | |
|---|---|---|
| 5,577,254 A | 11/1996 | Gilbert |
| 5,699,526 A | 12/1997 | Siefert |
| 5,715,314 A | 2/1998 | Payne |
| 5,717,879 A | 2/1998 | Moran |
| 5,721,906 A | 2/1998 | Siefert |
| 5,751,962 A | 5/1998 | Fanshier |
| 5,774,552 A | 6/1998 | Grimmer |
| 5,781,735 A | 7/1998 | Southard |
| 5,809,250 A | 9/1998 | Kisor |
| 5,825,880 A | 10/1998 | Sudia |
| 5,832,458 A | 11/1998 | Jones |
| 5,832,496 A | 11/1998 | Anand |
| 5,845,124 A | 12/1998 | Berman |
| 5,848,396 A | 12/1998 | Gerace |
| 5,848,412 A | 12/1998 | Rowland |
| 5,857,188 A | 1/1999 | Douglas |
| 5,867,578 A | 2/1999 | Brickell |
| 5,870,559 A | 2/1999 | Leshem |
| 5,894,516 A | 4/1999 | Brandenburg |
| 5,903,652 A | 5/1999 | Mital |
| 5,905,868 A | 5/1999 | Baghai |
| 5,909,492 A | 6/1999 | Payne |
| 5,930,786 A | 7/1999 | Carino, Jr. |
| 5,933,601 A | 8/1999 | Fanshier |
| 5,941,957 A | 8/1999 | Ingrassia, Jr. |
| 5,951,643 A | 9/1999 | Shelton |
| 5,951,652 A | 9/1999 | Ingrassia, Jr. |
| 5,954,798 A | 9/1999 | Shelton |
| 5,991,791 A | 11/1999 | Siefert |
| 6,006,228 A | 12/1999 | McCollum |
| 6,026,403 A | 2/2000 | Siefert |
| 6,035,332 A | 3/2000 | Ingrassia, Jr. |
| 6,085,223 A | 7/2000 | Carino, Jr. |
| 6,151,584 A | 11/2000 | Papierniak |
| 6,151,601 A | 11/2000 | Papierniak |
| 6,169,997 B1 | 1/2001 | Papierniak |
| 6,182,097 B1 | 1/2001 | Hansen |
| 6,253,203 B1 | 6/2001 | O'Flaherty |
| 6,286,030 B1 | 9/2001 | Wenig |
| 6,286,046 B1 | 9/2001 | Bryant |
| 6,286,098 B1 | 9/2001 | Wenig |
| 6,295,550 B1 | 9/2001 | Choung |
| 6,317,794 B1 | 11/2001 | Papierniak |
| 6,334,110 B1 | 12/2001 | Walter |
| 6,397,256 B1 | 5/2002 | Chan |
| 6,418,439 B1 | 7/2002 | Papierniak |
| 6,480,855 B1 | 11/2002 | Siefert |
| 6,502,096 B1 | 12/2002 | Siefert |
| 6,519,600 B1 | 2/2003 | Siefert |
| 6,589,980 B2 | 7/2003 | Miller |
| 6,651,072 B1 | 11/2003 | Carino, Jr. |
| 6,658,453 B1 | 12/2003 | Dattatri |
| 6,671,687 B1 | 12/2003 | Pederson |
| 6,714,931 B1 | 3/2004 | Papierniak |
| 6,766,333 B1 | 7/2004 | Wu |
| 6,850,975 B1 | 2/2005 | Danneels |
| 6,877,007 B1 | 4/2005 | Hentzel |
| 7,076,495 B2 | 7/2006 | Dutta |
| 7,260,837 B2 | 8/2007 | Abraham |
| 7,272,639 B1 | 9/2007 | Levergood |
| 7,278,105 B1 | 10/2007 | Kitts |
| 7,293,281 B1 | 11/2007 | Moran |
| 7,490,319 B2 | 2/2009 | Blackwell |
| 7,580,996 B1 | 8/2009 | Allan |
| 7,627,648 B1 | 12/2009 | Mehta |
| RE41,903 E | 10/2010 | Wenig |
| 8,042,055 B2 | 10/2011 | Wenig |
| 8,127,000 B2 | 2/2012 | Wenig |
| 8,219,531 B2 | 7/2012 | Eagan |
| 8,335,848 B2 | 12/2012 | Wenig |
| 8,381,088 B2 | 2/2013 | Kikin-Gil |
| 8,533,532 B2 | 9/2013 | Wenig |
| 8,583,772 B2 | 11/2013 | Wenig |
| 8,838,736 B2 | 9/2014 | Swahn |
| 2002/0049840 A1 | 4/2002 | Squire |
| 2002/0056091 A1 | 5/2002 | Bala |
| 2002/0065912 A1 | 5/2002 | Catchpole |
| 2002/0070953 A1 | 6/2002 | Barg |
| 2002/0083169 A1 | 6/2002 | Aki |
| 2002/0083183 A1 | 6/2002 | Pujare |
| 2002/0112035 A1 | 8/2002 | Carey |
| 2002/0165954 A1 | 11/2002 | Eshghi |
| 2003/0005000 A1 | 1/2003 | Landsman |
| 2003/0023715 A1 | 1/2003 | Reiner |
| 2003/0128233 A1 | 7/2003 | Kasriel |
| 2003/0145071 A1 | 7/2003 | Straut |
| 2003/0154289 A1 | 8/2003 | Williamson |
| 2004/0019675 A1 | 1/2004 | Hebeler, Jr. |
| 2004/0059809 A1 | 3/2004 | Benedikt |
| 2004/0059997 A1 | 3/2004 | Allen |
| 2004/0078464 A1 | 4/2004 | Rajan |
| 2004/0100507 A1 | 5/2004 | Hayner |
| 2004/0158574 A1 | 8/2004 | Tom |
| 2005/0021713 A1 | 1/2005 | Dugan |
| 2005/0030966 A1 | 2/2005 | Cai |
| 2005/0033803 A1 | 2/2005 | Vleet |
| 2005/0066037 A1 | 3/2005 | Song |
| 2005/0071464 A1 | 3/2005 | Kuwata |
| 2005/0071760 A1 | 3/2005 | Jaeger |
| 2005/0086606 A1 | 4/2005 | Blennerhassett |
| 2005/0188080 A1 | 8/2005 | Motsinger |
| 2005/0216856 A1 | 9/2005 | Matti |
| 2005/0246651 A1 | 11/2005 | Krzanowski |
| 2005/0278565 A1 | 12/2005 | Frattura |
| 2006/0048153 A1* | 3/2006 | Truong .......... 718/100 |
| 2006/0048214 A1 | 3/2006 | Pennington |
| 2006/0075088 A1 | 4/2006 | Guo |
| 2006/0117055 A1 | 6/2006 | Doyle |
| 2006/0123340 A1 | 6/2006 | Bailey |
| 2006/0162071 A1 | 7/2006 | Dixon |
| 2006/0230105 A1* | 10/2006 | Shappir et al. ......... 709/203 |
| 2006/0248452 A1 | 11/2006 | Lambert |
| 2007/0106692 A1 | 5/2007 | Klein |
| 2007/0174410 A1* | 7/2007 | Croft et al. ............. 709/208 |
| 2007/0226314 A1 | 9/2007 | Eick |
| 2007/0245249 A1 | 10/2007 | Weisberg |
| 2007/0255754 A1 | 11/2007 | Gheel |
| 2008/0005661 A1 | 1/2008 | Yao |
| 2008/0005793 A1 | 1/2008 | Wenig |
| 2008/0034036 A1 | 2/2008 | Takeshima |
| 2008/0046562 A1 | 2/2008 | Butler |
| 2008/0052377 A1 | 2/2008 | Light |
| 2008/0127217 A1 | 5/2008 | Wang |
| 2008/0162498 A1 | 7/2008 | Omoigui |
| 2008/0184129 A1 | 7/2008 | Cancel |
| 2008/0209311 A1 | 8/2008 | Agronik |
| 2008/0216094 A1 | 9/2008 | Anderson |
| 2008/0294974 A1 | 11/2008 | Nurmi |
| 2009/0013347 A1 | 1/2009 | Ahanger |
| 2009/0019133 A1 | 1/2009 | Brimley |
| 2009/0024930 A1 | 1/2009 | Kim |
| 2009/0037517 A1 | 2/2009 | Frei |
| 2009/0037914 A1 | 2/2009 | Chagoly |
| 2009/0063968 A1 | 3/2009 | Wenig |
| 2009/0070869 A1 | 3/2009 | Fan |
| 2009/0083714 A1 | 3/2009 | Kiciman |
| 2009/0132957 A1 | 5/2009 | Reddy |
| 2009/0138554 A1 | 5/2009 | Longobardi |

(56) References Cited

U.S. PATENT DOCUMENTS

| | | |
|---|---|---|
| 2009/0228474 A1 | 9/2009 | Chiu |
| 2009/0247193 A1 | 10/2009 | Kalavade |
| 2009/0254529 A1 | 10/2009 | Goldentouch |
| 2010/0007603 A1 | 1/2010 | Kirkup |
| 2010/0042573 A1 | 2/2010 | Wenig |
| 2010/0058285 A1 | 3/2010 | Meijer |
| 2010/0070929 A1 | 3/2010 | Behl |
| 2010/0146380 A1 | 6/2010 | Rousso |
| 2010/0169792 A1 | 7/2010 | Ascar |
| 2010/0211638 A1 | 8/2010 | Rougier |
| 2010/0251128 A1 | 9/2010 | Cordasco |
| 2010/0268694 A1 | 10/2010 | Denoue |
| 2010/0287229 A1 | 11/2010 | Hauser |
| 2010/0318507 A1 | 12/2010 | Grant |
| 2011/0029665 A1 | 2/2011 | Wenig |
| 2011/0173239 A1 | 7/2011 | Sayed |
| 2011/0320880 A1 | 12/2011 | Wenig |
| 2012/0002903 A1 | 1/2012 | Wilensky |
| 2012/0038678 A1 | 2/2012 | Hwang |
| 2012/0084437 A1 | 4/2012 | Wenig |
| 2012/0089950 A1 | 4/2012 | Tseng |
| 2012/0102101 A1 | 4/2012 | Wenig |
| 2012/0151329 A1 | 6/2012 | Cordasco |
| 2012/0151384 A1 | 6/2012 | Stass |
| 2012/0157122 A1 | 6/2012 | Niranjan |
| 2012/0173966 A1 | 7/2012 | Powell |
| 2013/0069947 A1 | 3/2013 | Berstler |
| 2013/0091417 A1 | 4/2013 | Cordasco |
| 2013/0104065 A1 | 4/2013 | Stecher |
| 2013/0339428 A1 | 12/2013 | Wenig |
| 2014/0063174 A1 | 3/2014 | Junuzovic |
| 2014/0108911 A1 | 4/2014 | Damale |
| 2014/0109018 A1 | 4/2014 | Casey |
| 2014/0115712 A1 | 4/2014 | Powell |
| 2014/0137052 A1 | 5/2014 | Hernandez |
| 2014/0143652 A1 | 5/2014 | DeLoach |

FOREIGN PATENT DOCUMENTS

| | | |
|---|---|---|
| EP | 0 326 283 A1 | 8/1989 |
| EP | 0 843 449 A2 | 5/1998 |
| EP | 1097428 B1 | 6/2002 |
| EP | 07840244.3 | 2/2008 |
| EP | 08769998.9 | 3/2009 |
| GB | 2357680 A | 2/2008 |
| WO | 98/25372 A2 | 6/1998 |
| WO | 98/26571 A2 | 6/1998 |
| WO | 98/36520 A1 | 8/1998 |
| WO | 00/13371 A1 | 3/2000 |
| WO | 02/17165 | 2/2002 |
| WO | 2008/019193 A2 | 2/2008 |
| WO | 2009/029316 A1 | 3/2009 |
| WO | 2010/019258 | 2/2010 |

OTHER PUBLICATIONS

Holloway, et al., "Cryptographic Initialization Test", IBM Technical Disclosure Bulletin, pp. 195-198, Feb. 1991.

Al-Qaimare G., et al., Kaldi: A Computer-Aided Usability Engineering Tool for Supporting Testing and Analysis of Human-Computer Interation:, Computer-Aided Design of User Interfaces. Proceedings of the International Conference on Computer-Aided Design of User Interfaces, Proceedings of CADUI, xx, xx, Oct. 21, 1999, pp. 337-355.

Peter Brusilovsky et. al., "Adaptive and Intelligent Web-based Educational Systems," International Journal of Artificial Intelligence in Education, Apr. 1, 2003, pp. 159-172, XP55039152, The Netherlands Retrieved from the Internet: URL: http://www.sis.pitt.edu/~peterb/papers/AIWBES.pdf [retrieved on Sep. 25, 2012] p. 160-161.

Teare, An Introduction to Ajax, Aug. 2005, http://www.oracle.com/technetwork/articles/entarch/ajax-introduction-096831.html.

Atterer, R. et al. : "Knowing the User's Every Move—User Activity Tracking for Website Usability Evaluation and Implicit Interaction," WWW '06 Proceedings of the 15th World Wide Web, ACM, New York, NY, USA, May 22, 2006, pp. 203-212, XP002519605, DOI: 10.1145/1135777.1135811 ISBN 978-1-5959-323-2.

Rubio, An Introduction to JSON, Feb. 28, 2007, http://www.oracle.com/technetwork/articles/entarch/introduction-json-097942.html.

Reed Martin; Using Google Analytics Site Overlay; Community Spark; Apr. 13, 2007. Online: <http://www.communityspark.com/using-google-analytics-site-overlay/>.

Lubarsky, How to Delete Cookie Using Javascript, Aug. 19, 2007, http:web.archive.org/web/20070819123555/http://blogs.x2line.com/al/articles/316.aspx.

International Search Report for PCT/US2007/071096; Date of mailing May 13, 2008.

Written Opinion of the International Searching Authority for PCT/US07/71096; Mailing date May 13, 2008.

International Search Report for PCT/US08/65582; Date of Mailing Sep. 11, 2008.

Written Opinion of the International Searching Authority for PCT/US08/65582; Mailing date Sep. 11, 2008.

Han et al., "Using Ajax for Desktop-;like Geospatial Web Application Development," Geoinformatics, 2009 17th International Conference on Aug. 12-14, 2009, <http://geobrain.laits.gmu.edu/geobrainhome/docs/GeOnAS_Ajax.pdf>.

International Search Report for PCT/US09/04654; Date of mailing Oct. 2, 2009.

Written Opinion of the International Searching Authority; PCT/US09/04654; Date of mailing Oct. 2, 2009.

PCT Search Report for PCT/US2011/033813; Mailing Date Jul. 28, 2011.

Written Opinion of the International Searching Authority for PCT/US2011/033813; Mailing Date Jul. 28, 2011.

International Search Report for PCT/US11/35410; Date of mailing Dec. 14, 2011.

Written Opinion of the International Searching Authority; PCT/US11/35410; Date of mailing Dec. 14, 2011.

International Search Report for PCT/US12/25971; Date of mailing May 31, 2012.

Written Opinion of the International Searching Authority for PCT/US12/25971; Date of mailing May 31, 2012.

International Search Report for PCT/US2013/023636; Date of Mailing Aug. 13, 2013.

Written Opinion of the International Searching Authority for PCT/US2013/023636; Date of Mailing Aug. 13, 2013.

Summons to attend oral proceedings pursuant to Rule 115(1) in EP App. No. 07840244.3; Dated Dec. 12, 2013.

Communication from the EP Patent Office pursuant to Article 94(3) EPC in EP Application No. 09806979.2; dated Jan. 6, 2014.

Smith et al., "Automated Protocol Analysis," Human Computer Interaction, 8:101-145, 1993.

Stolowitz Ford Cowger LLP; Listing of Related Cases; Nov. 12, 2014; 2 pages.

MEL; Distribute Paths to Separate Layers—Illustrator Tutorial; pp. 1-3; Aug. 23, 2009.

* cited by examiner

DYNAMICALLY CONFIGURABLE SESSION AGENT

The present application is a divisional patent application of U.S. patent application Ser. No. 13/972,776 filed on Aug. 21, 2013, which issued on Nov. 25, 2014 as U.S. Pat. No. 8,898,275, which is a divisional patent application of U.S. patent application Ser. No. 12/904,356 filed on Oct. 14, 2010, which issued on Nov. 12, 2013 as U.S. Pat. No. 8,583,772, which claims priority to U.S. Provisional Patent Application Ser. No. 61/332,498 filed on May 7, 2010 and is also a continuation-in-part of U.S. patent application Ser. No. 12/191,585 filed Aug. 14, 2008, which issued on Feb. 3, 2015 as U.S. Pat. No. 8,949,406, which are all herein incorporated by reference in their entirety.

This application incorporates by reference in their entirety U.S. patent application Ser. No. 11/616,616, filed Dec. 27, 2006; and U.S. patent application Ser. No. 12/049,245, filed Mar. 14, 2008.

BACKGROUND

Intelligent networked devices like smart phones present new challenges when trying to understand end user experiences and application behavior. The intelligent devices use a new class of applications that leverage distributed code, local databases, and intermittent network communications. The use of these applications on intelligent phones and the use of "fat applications" on personal computers have caused an explosion in application complexity.

The majority of occasional use applications previously leveraged web browser technology. The web browser was responsible for rendering content and allowing end user interactivity. However, the new distributed applications are downloaded and installed on demand, instead of being dynamically referenced by Universal Resource Language (URL) calls from a web browser.

The data and state in distributed applications is persistent on the client, and network connectivity varies based on mode and location. Because these types of applications are not driven through a browser the rendering, painting, displays, etc. on the screen of the device are often performed by proprietary code in the application that is not readily viewable by monitoring devices.

Monitoring systems are used for monitoring and understanding user experiences during web sessions. The monitoring systems typically use extensive application instrumentation that logs key user session events or actions and logs the metadata (performance, etc) of the events. This style of logging might be performed by a client device, the server, or both. However, there are significant challenges bringing together dispersed log files from the client device and the server. The challenges from a physics perspective include moving the different log files into one repository, and the challenge from a replay perspective to includes accurately stitching together a user experience from the log files obtained across multiple tiers.

Correctly evaluating a user experience during an application session depends on understanding what the user actually saw on the screen and what actions the user took while particular information was displayed on the screen. Correlating and collecting the different pieces of data associated with the application session still may not clearly illustrate all of the issues associated with the user experience. Distributed applications increase the difficulty of accurately monitoring and understanding web sessions since there is less access to the internal workings of the application software. Distributed applications are also often loaded on handheld wireless devices that have limited processing capabilities.

OVERVIEW

A monitoring system captures the behavior of distributed applications running on mobile devices, personal digital assistants, smart phones, or any other personal computers or computing devices." The monitoring system also provides a framework for augmenting functionality of the application in response to user interactions and different states of the application and network.

Client events may include, but are not limited to, data entered into forms displayed on the client device, mouse clicks, keyboard entries, screen scans, or any other events generated locally by the application or the user. Network events include the communications exchanged between the application running on the client and an application server on the web server device. The disparate client and network events are captured and combined together during a replay operation to simulate the user experience during the previous application session.

The captured client events include bitmaps of screen images displayed on the client device. The screen images are selectively scanned, logged, and selectively sent to an archive location. Completed full screen images can be captured or partial selected portions of screen images can also be captured. Partial screenshots can then be overlaid on full screenshots or merged with other partial screenshots using techniques such as tiling.

Capturing an image displayed on the client device (scanned bitmap) may provide valuable information. However, the scanned image by itself may have limited value. For example, scanned screen images generally cannot be searched for particular information, such as different fields and cannot be drilled down to identify information contained or associated with a particular field. The monitoring system uses special reference identifiers to link together the scanned screen images and the other disparate pieces of data that are to captured during the same application session. The reference identifiers allow the scanned image data to be integrated with other captured events to provide a better understanding of the application session.

The monitoring system may also selectively capture the different client events and network events according to feedback instructions from an application session monitor. Based on previously captured data, the session monitor may send feedback instructions for performing different operations. For example, the feedback instructions may cause the session agent to drill down and capture specific application states or client events that may not have been normally anticipated or detectable. The feedback instructions can also be used for providing support and incentives during the application sessions. Other operations may include, but are not limited to, selective/test marketing, testing, solicitations, user feedback/surveys, etc.

DETAILED DESCRIPTION

Figure 1:
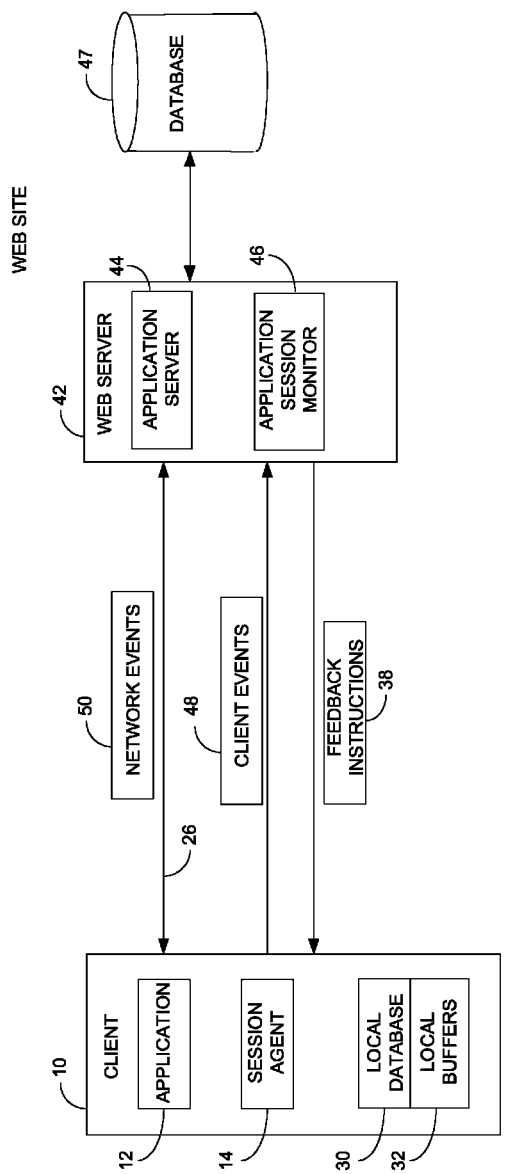
FIG. 1 is a block diagram showing an application monitoring system.

FIG. 1 shows an application 12 operating on an intelligent device referred to generally as client 10. The client 10 can be any computing device that operates a distributed application 12. For example, the client 10 could be a smart phone, Personal Digital Assistant (PDA), personal computer, etc. For simplicity, only one application 12 is shown in FIG. 1. However, it should be understood that multiple different applications 12 may exist and operate on the same client 10 and a similar application 12 may be downloaded onto multiple different clients 10.

The application 12 can be any software and/or hardware that operates on the client 10. For example, the application 12 could communicate with a remote server for purchasing items, playing video games, digital navigation, checking stock quotes, checking the weather, searching the Internet, etc. These of course are just examples of any application that may be operated by the client 10. The client 10 may operate a local database 30 and other local buffers 32 that contain contact information, Global Positioning System (GPS) data, and any other data that may be used in conjunction with application 12. Of course the types of data stored in database 30 and local buffers 32 is almost limitless.

A web server device 42 operates an application server 44 that communicates with application 12 on client 10. The application server 44 stores data associated with the application 12 in a database 47. In one example mentioned above, the application server 44 identifies items that are selected and purchased by a user via application 12. The database 47 stores the product information, inventory information, and the user purchase and credit card information accessed by application server 44.

In the navigation example, the application 12 requests electronic map data from the application server 44. The application server 44 accesses map data in database 47 and sends the map data to the navigation application 12 on client 10. The navigation application 12 may store some or all of the received map data in local database 30 or local buffers 32. These are just examples, and any type of electronic communication or data can be exchanged between the application 12 and application server 44.

The application 12 can communicate with the application server 44 over a wired or wireless connection 26. For example, the connection 26 may be a wired or wireless Internet connection or a wired or wireless telephone connection. In one example, the application 12 accesses the application server 44 using the HyperText Transport Protocol (HTTP) or HTTP over Secure Sockets Layer (SSL) (HTTPS).

An application session monitor 46 monitors and captures network events 50 that are exchanged between the application 12 and the application server 44 during the application session. For example, the network events 50 can include requests from the application 12 for product information and the responses back from the application server 44 that contain the to requested product information. The application session monitor 46 may be located on the same web server 42 that operates the application server 44 or may be located on a different server device located either at the same web site as the web server 42 or located at a different intermediate web site location.

A session agent 14 operates locally on the client 10 in conjunction with the application 12 to monitor and capture local client events 48 that may not necessarily be transmitted over the network connection 26 between the application 12 and application server 44. For example, the application 12 may include logic that generates an error message whenever a user enters the wrong information into a particular field. The error message may be displayed locally on a client screen but never sent back to the application server 44. The client events 48 could include a scanned screen image from client 10 that displays the error message. The client events 48 can also include cursor movements, mouse click operations, keyboard entries, screen scans, or any other data generated locally on the client 10.

Applications that run on web browsers typically transfer web pages from a web server to different remote clients. Other data from the web session is then exchanged through the HTML in the web pages transferred between the web browser and the web server. Thus, much of information from a browser based web session can be captured relatively easily. However, distributed application 12 does not necessarily operate with web browsers. Also, many of the different states, operations, and data generated by application 12 during an application session may not necessarily involve communications with application server 44.

The application 12 may also access different data sources other than application server 44. For example, the application 12 may access the local database 30 or local buffers 32 in the client 10 for information. Further the data generated during the application session may not use a textual format such as HTML and may be encoded or encrypted. Thus, the primary data sources for capturing a browser web session, namely web pages and the textual to data transferred between a web browser and a web server, may not exist in application sessions for application 12.

One possible solution to the reduced transparency of application sessions would be to increase the amount of data captured locally on the client 10 by the session agent 14. However, the session agent 14 would then require more processing bandwidth and memory in the client 10 and could slow down the application 12. This is an even larger problem when the client 10 is a portable wireless device that has limited processing memory capacity.

To address these issues, an application session monitor 46 dynamically adjusts what data is captured by the session agent 14 according to particular application session states. For example, based on the captured network events 50, the session monitor 46 may determine that a user is having trouble completing an order for purchasing a product selected through an ecommerce application 12. The session monitor 46 may send back feedback instructions 38 that cause the session agent 14 to only capture the local client events 48 associated with the final ordering stage of the on-line transaction. The feedback instructions 38 cause the session agent 14 to only capture the client events 48 relevant in identifying the cause of the user problem. Based on the captured client events 48, the session monitor 46 may send other feedback instructions 38 that cause the session agent 14 to capture additional client events that further drill down into the state of the application session where the user is currently having problems.

In another embodiment, the session agent 14 may continuously capture and store client events 48 in local buffers 32. If a particular web session state is identified in the network events 50, the application session monitor 46 sends feedback instructions 38 directing the session agent to send the client events 48 previously captured in local buffers 32. The session agent 14 may continuously keep a few minutes of historic data for the web session in local buffers 32. If there are no feedback instructions 38 requesting the historical web session data, the session agent 14 can automatically delete the data in local buffers 32 and start storing the client events 48 for a next few minutes of the web session.

Figure 2:
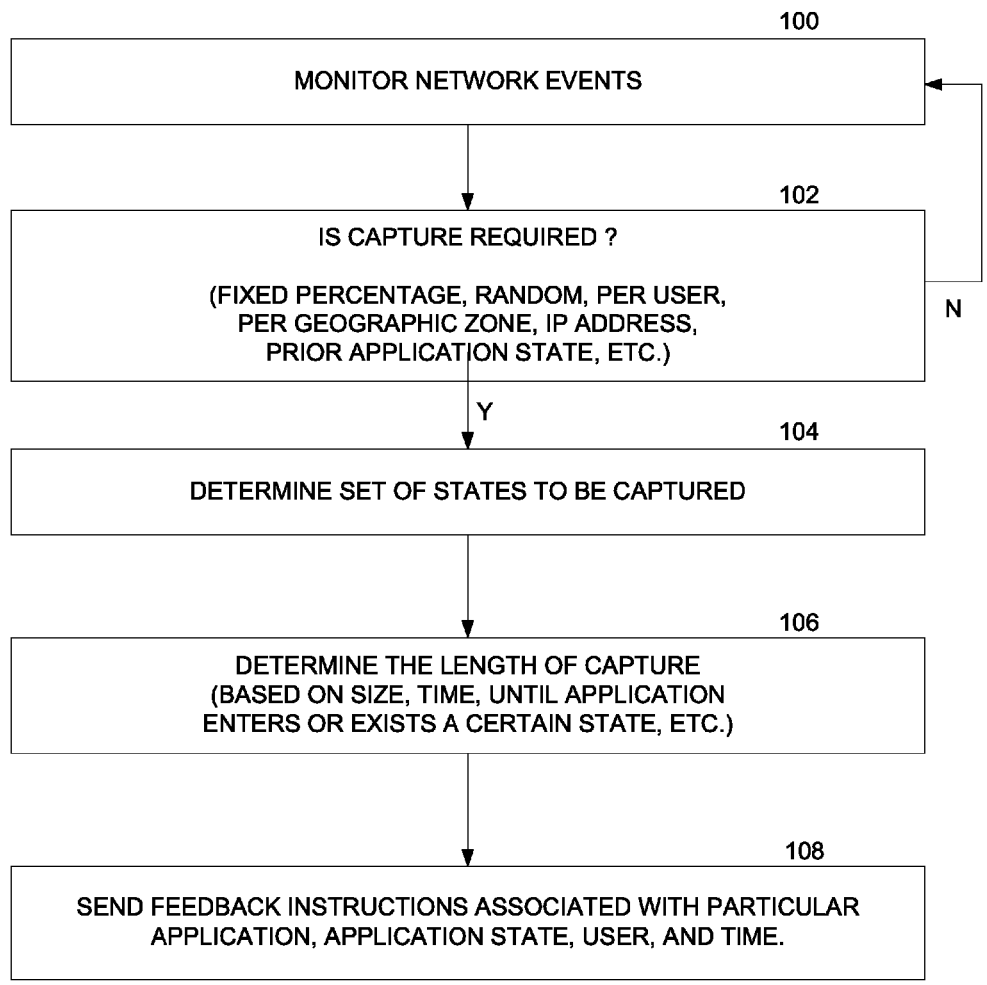
FIG. 2 is a flow diagram explaining the monitoring system of FIG. 1 in more detail.

FIG. 2 describes some of the dynamic capture operations in more detail. Referring to FIGS. 1 and 2, the application session monitor 46 in operation 100 monitors the network events 50 sent between the application server 44 and the application 12. In operation 102, the session monitor 46 determines if capture is required for a particular application session. This can be based on preconfigured information referenced by the session monitor 46. For example, client events 48 may be captured for a fixed or random percentage of application sessions.

The session monitor 46 may also determine what applications or application sessions to capture based on a particular user, geographic zone where the application session is in operation, IP address used in the application session client, prior application states of the application session, etc. For example, particular users may frequently experience problems with application 12. The session monitor 46 determines when particular users are operating the application 12 based on their login information and send feedback instructions 38 to the session agent 14 to capture client events 48 only for those identified users.

The session monitor 46 in operation 104 determines what particular set of states of the application session should be captured based again on preconfigured criteria or based dynamically on a particular sequence of actions or client events 48 and/or network events 50. Many of the application states may be of no interest or may not be related to problems identified by the session monitor 46. Accordingly, the session monitor 46 may send feedback instructions 38 that direct the session agent 14 to only capture client events 48 for those particular application states.

For example, the session monitor 46 may direct the session agent 14 to capture the subsequent client events 48 and states of the application session after a user has electronically selected shopping cart items that have a total price of over 100 dollars. In another example, an error message may be generated during a particular state of the application session. If no other error messages are generated during the application session, the session monitor 46 may send feedback instructions 38 that direct the session agent 14 to capture the events in the application state associated with the identified error message. For example, the feedback instructions 38 may direct the session agent 14 to only capture, or provide the previously captured, client events 48 associated with the state that generated the error message.

In operation 106 the session monitor 46 determines the length of the capture operation based on size, time, state, etc. For example, the session monitor 46 may direct the session agent 14 to capture client events 48 until a particular amount of data is captured. In another example, the same network events 50 may be repeatedly sent from application 12 to application server 44. This could indicate a possible error condition or a confused user. The session monitor 46 may generate feedback instructions 38 instructing the session agent 14 to start capturing client events 48 only during that particular error condition. In another example, the network events 50 may contain error messages sent by the application 12 every three minutes. The application session monitor 46 may send feedback instructions 38 to capture the client events 48 for one or two time periods of 3-6 minutes. This would allow the session agent 14 to capture just enough information to identify the source of the error messages without having to capture additional client events or states.

In operation 108, the application session monitor 46 sends the feedback instructions 38 to session agent 14. Client events 48 and network events 50 are captured by the session agent 14 responsive to the feedback instructions 38. The captured events are then forwarded to the session monitor 46 and/or to an application session archive. The process might be repeated where the session monitor 46 sends additional feedback instructions 38 based on the client events 48 captured responsive to the previously sent feedback instructions.

The feedback instructions provide the advantage that the session agent 14 only has to capture, buffer, and send client events 48 for selected portions of an application session. The session agent 14 uses less storage and processing bandwidth in the client device 10 and is therefore less likely to slow down the application 12.

Screen Capture

Figure 3:
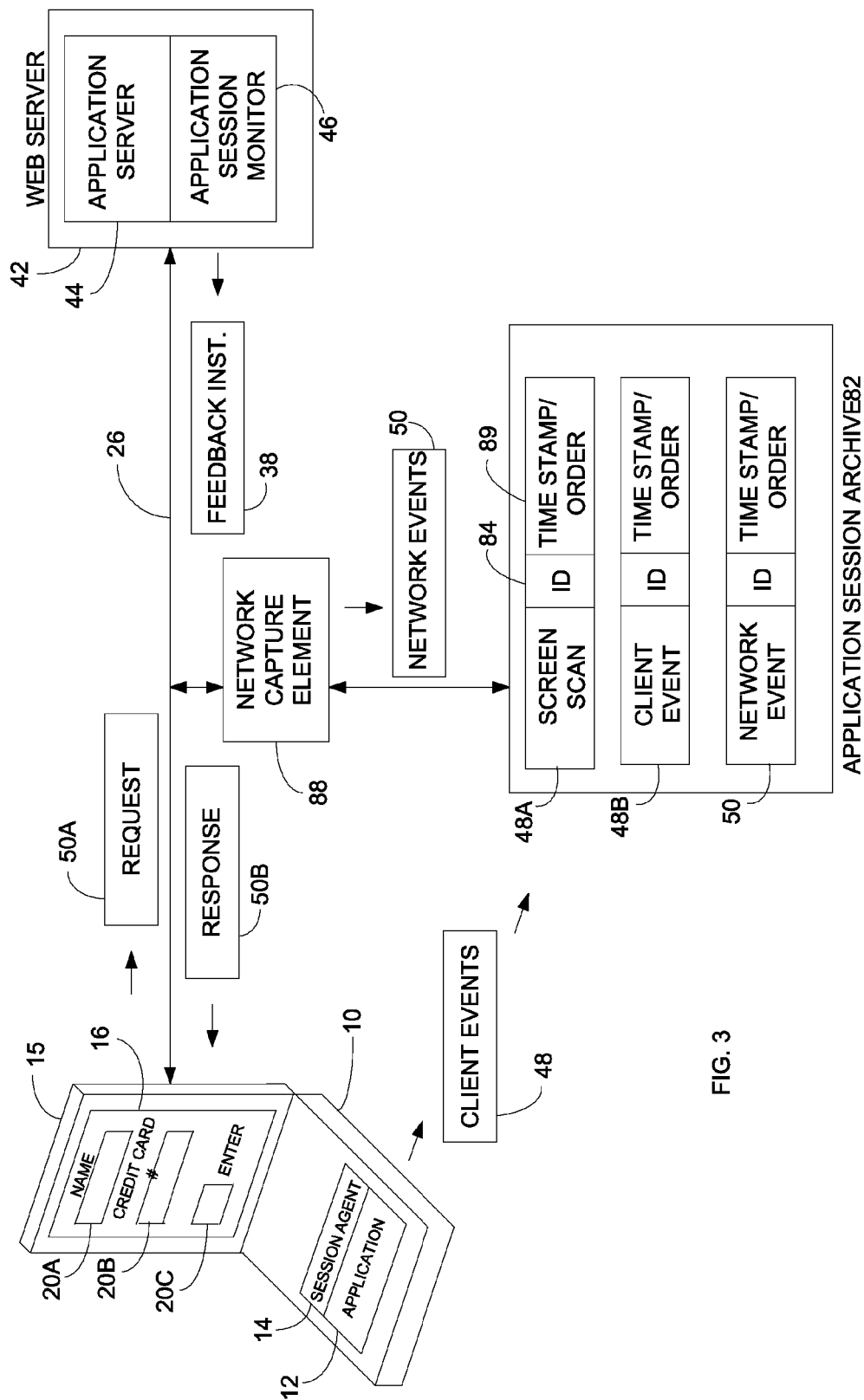
FIG. 3 is a block diagram showing another embodiment of the monitoring system that captures screen images.

FIG. 3 shows another example of how the feedback instructions 38 are used to dynamically control how the session agent 14 captures screen images. A network capture element 88 captures the network events 50 exchanged between the application 12 and application server 44 during an application session. The network capture element 88 can comprise software that operates on the same web server device 42 that operates the application server 44. In another embodiment, the network capture element 88 operates on a separate server that might be located within the same enterprise network as web server 42. In another embodiment, the network capture elements 88 is located somewhere else in a packet switched network 26. In yet another embodiment, the network capture element 88 is software that operates on the same client 10 that operates the session agent 14.

The application 12 displays an image 16 on a screen 15 of the client 10. The displayed image 16 includes a field 20A for entering a user name and a field 20B for entering a credit card number. A user enters information into fields 20A and 20B and selects/clicks an enter field 20C that causes the information entered into fields 20A and 20B to be sent back as a request 50A to the application server 44 operating on web server 42.

The session agent 14 and/or the network capture element 88 receive feedback instructions 38 from the session monitor 46. As described above, the feedback instructions 38 identify any application state or any particular client event 48, network event 50, or any other data item for capturing. The feedback instructions 38 may also direct the session agent 14 and network capture element 88 to send back buffered events from a previous state of the application session that happened earlier in time.

For example, the session agent 14 or network capture element 88 may have been programmed or directed via feedback instructions 38 to continuously scan the screen images 16 and capture associated client events 48 and network events 50. The captured events may be temporarily stored in the local database 30 or local buffers 32 in the client 10 shown in FIG. 1. The session agent 14 and network capture element 88 may not transfer the captured events to the session monitor 46 or to a session archive 82 unless directed by feedback instructions 38.

The different screen displays 16 and other client events 48 occurring during the application session might not be displayed by a web browser on a web page. Therefore, the screen image data may need to be captured with a screen scan that captures the displayed screen bit map. However these screen scans are not typically in a format that can be searched and typically do not contain information that associates the scanned screen image with a particular application session. Thus, the client events 48, screen images 16, and network events 50 generated during an application session may be disparate pieces of information that are not normally associated with a common application session. This is contrary to HTML web pages that use a common format that is typically easy to search and often contains information that associates the web page with a particular web session.

In order to capture, archive, and replay the application session, the session agent 14 and network capture element 88 generate unique identifiers 84 that associate these disparate pieces of information with a same application session. The network events 50 often have searchable data that can be associated with a particular application session. For example, the network events 50 can identify a particular user, a particular application, a particular start and stop of the application session, etc. Other less correlated events such as mouse movements, to keyboard entries, and screen scans are linked to the network events 50 by session identifiers 84 and time stamp or ordering values 88 so that these disparate events from the application session can be combined and synchronized in a replay session.

Figure 4:
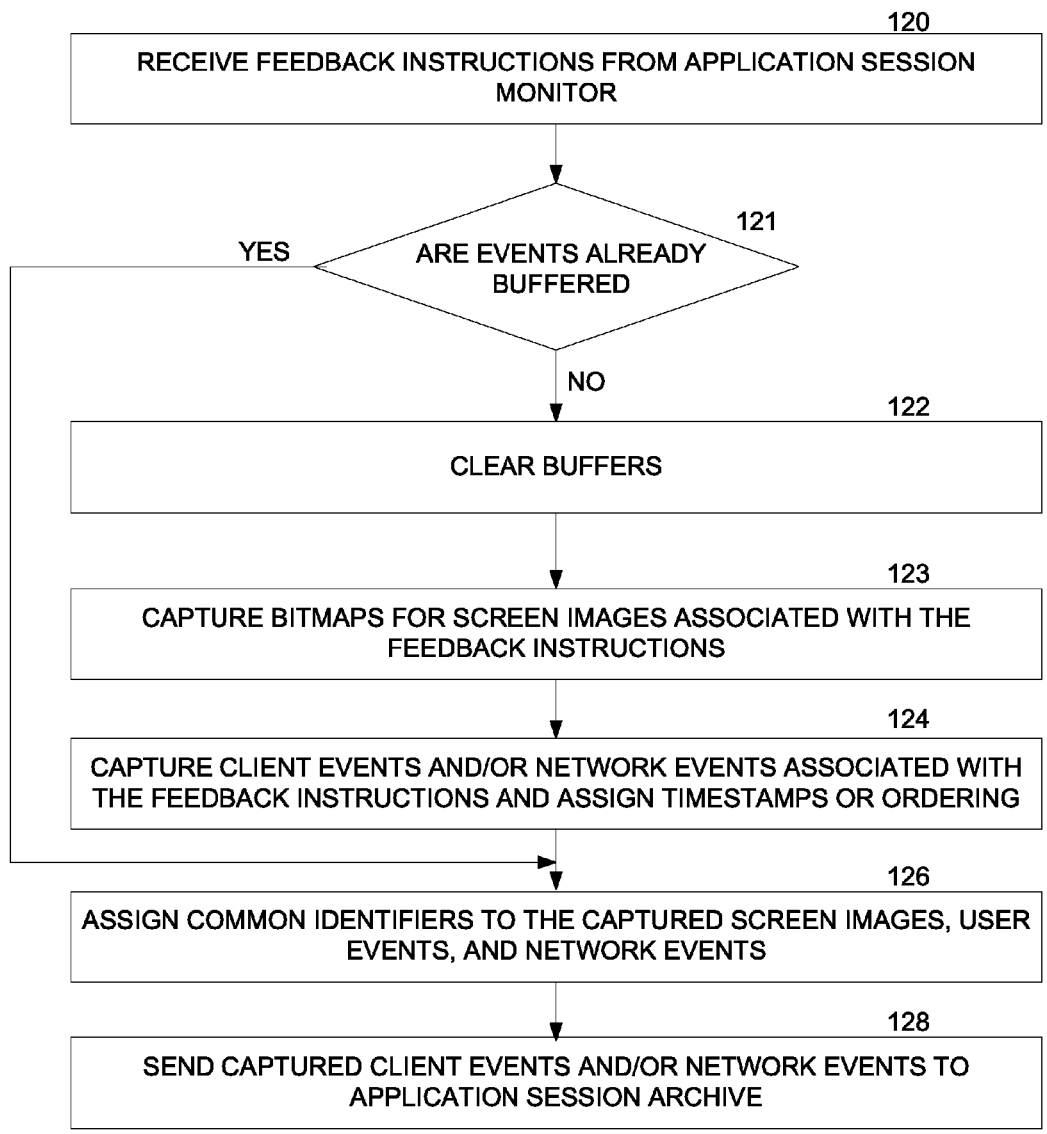
FIG. 4 is a flow diagram explaining the monitoring system of FIG. 3 in more detail.

Referring to FIGS. 3 and 4, the session agent 14 and/or network capture element 88 receive feedback instructions 38 from the session monitor 46 in operation 120. The session agent 14 and network capture element 88 in operation 121 determines if the events associated with the feedback instructions 38 have been previously captured in associated buffers. If not, any previously captured events contained in the buffers of client 10 and network capture element 88 may be cleared in operation 122.

If the events are not captured in buffers, the session agent 14 in operation 123 captures the bitmaps for the screen images 16 or portions of screen images 16 associated with the feedback instructions 38, if any. Any other client events 48 associated with the feedback instructions 38 are captured by the session agent 14 in operation 124 and any network events 50 associated with the feedback instructions 38 are captured by the network capture element 88 in operation 124.

The session agent 14 may be compiled along with the application 12. Therefore, the session agent 14 can monitor the operations of the application 12 and discover the identifiers and x-y pixel locations of fields 20A, 20B, and 20C displayed on screen 15. The feedback instructions 38 may then simply contain the identifier for a particular field which would then cause the session agent 14 to scan the x-y pixel locations associated with the field identifier. The session agent 14 could also store portions of previously scanned images according to their field identifiers and a time stamp. The feedback instructions 38 could then request particular portions of previously displayed screen images according to the associated field identifier and time stamp.

The session agent 14 and network capture element 88 assign time stamps 89 or a particular ordering to the captured screen images 48A, as well as other captured client events 48B, and captured network events 50. For example, the session agent 14 may use a reference counter or timer that assigns time stamp or sequencing values 89 to the client events 48 in the order, or at the time, the events are captured.

The time stamps or sequencing 89 provide a time line that can then be used during a replay session to replay the application session.

In operation 126 the session agent 14 and network capture element 88 assign common identifiers 84 to all of the captured client events 48 and captured network events 50, respectively, associated with the feedback instructions 38. The feedback instructions 38 then use the unique identifier 84 assigned by the session agent 14 and network capture element 88 to reference particular application sessions or states within the application sessions.

At some later time a replay system may replay the captured events 48 and 50 having the same identifier 84. For example, the first captured event associated with a particular identifier 84 may be the captured screen scan 48A. The replay system re-renders the bit map of the captured screen image. The next time stamp or sequence number 89 may be for a second partial screen scan of field 20A in FIG. 3 that captures characters entered into field 20A. Accordingly, the replay system next displays the partial screen scan 48B entered into field 20A.

Thus, different disparate data is captured during the application session. The data is assigned a common identifier ordering and then synchronized and interlaced together during a replay operation to discover what events actually took place during the previous application session. By interlacing the captured screen data on a timeline with other client events 48 and network events 50, the session/steps/screens of the application session become searchable and discoverable.

User Profiling

Figure 5:
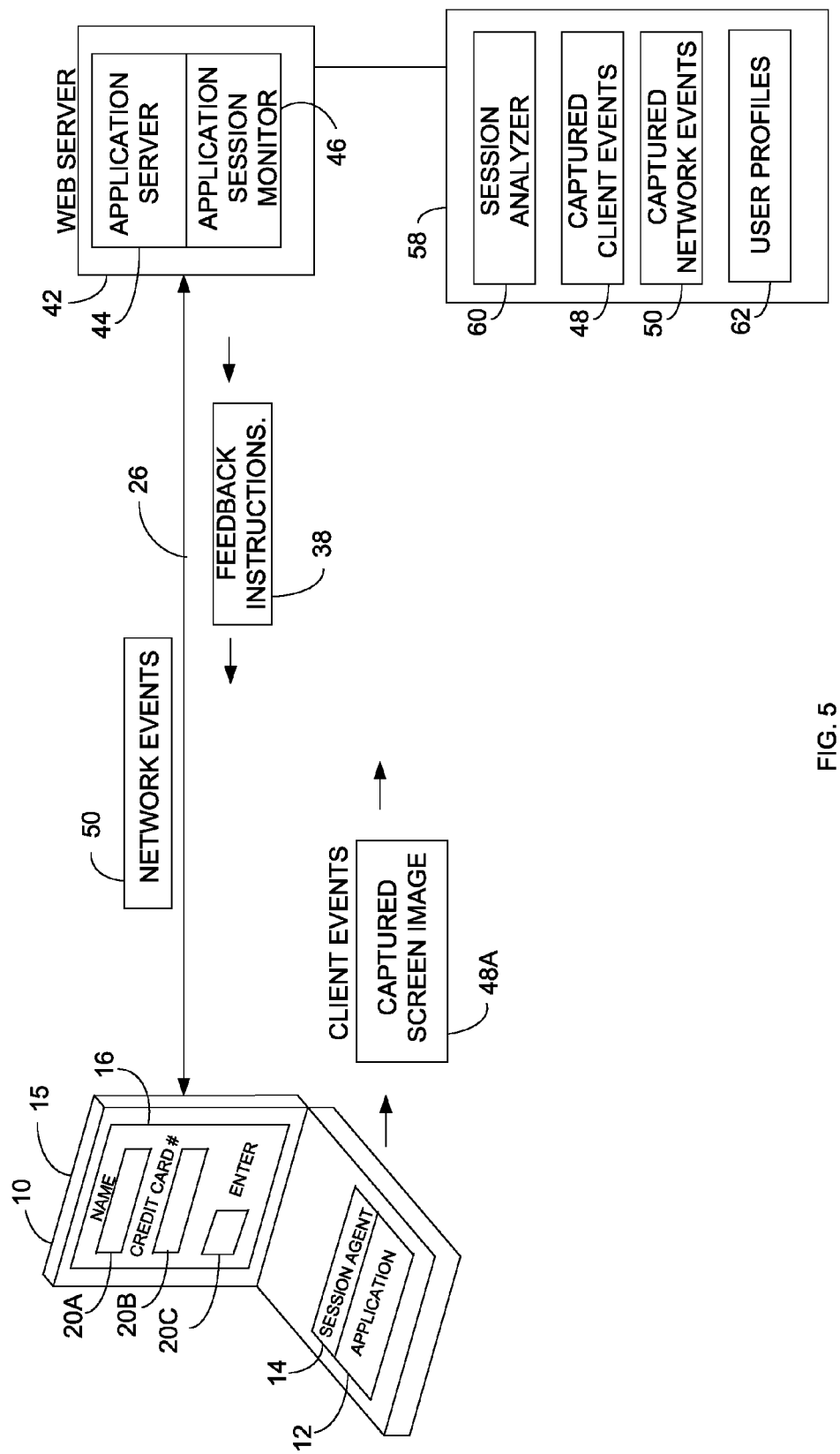
FIG. 5 is a block diagram showing another embodiment of the monitoring system that generates user profiles.

FIG. 5 shows another embodiment of the monitoring system that uses a session analyzer 60 to conduct real-time application session analysis. The session analyzer 60 may or may not be located in the same web server 42 as application session monitor 46. The feedback instructions 38 could be sent either by the application session monitor 46 or the session analyzer 60. However for simplicity the feedback instructions 38 will be described as being sent by the session monitor 46.

The client events 48 and network events 50 could also be sent either to the application session monitor 46 or directly to the session analyzer 60. However, for simplicity the client events 48 and network events 50 will be described as being sent to and received by the session monitor 46. If additional analysis was required, the application session monitor 46 could forward any received captured events to the session analyzer 60. Any analysis of the client events 48 and network events 50 could be performed by either the session monitor 46 or the session analyzer 60. However, for simplicity the session analyzer 60 will be described as creating and analyzing user profiles 62.

Figure 6:
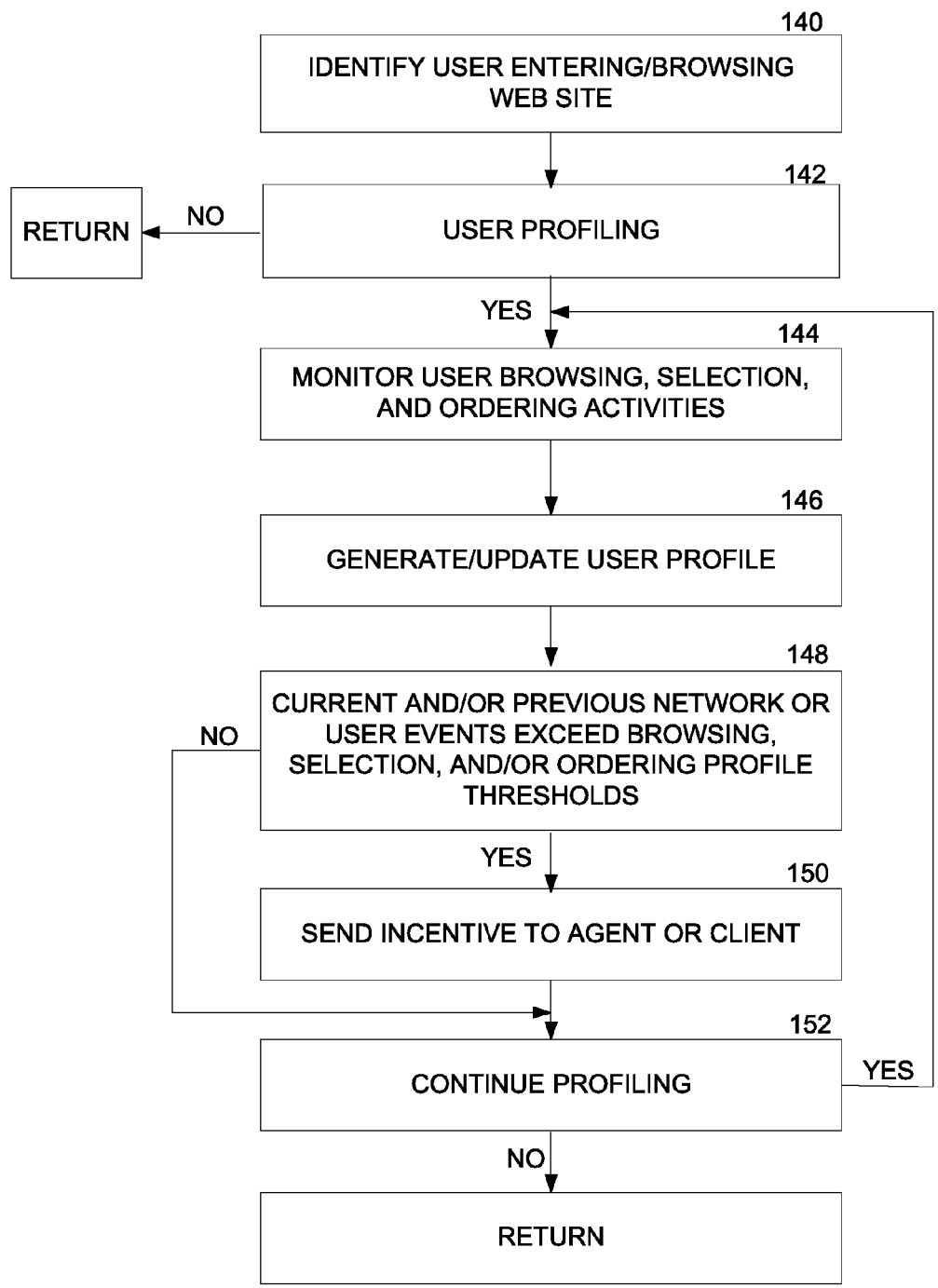
FIG. 6 is a flow diagram explaining the operations performed by the monitoring system in FIG. 5.

The feedback instructions 38 sent to the session agent 14 may be based on user profiles 62. The user profiles 62 are generated by the session analyzer 60 according to the client events 48 and network events 50 captured during application sessions. FIG. 6 describes one example where user incentives are sent to the session agent 14 based on the user profiles 62. Of course any variety of different feedback instructions 38 may be initiated based on any variety of different derived user profiles 62.

Referring to FIGS. 5 and 6, the application session monitor 46 identifies a user entering or browsing a web site. For example, the session monitor 46 monitors the network events 50 sent back and forth between the application 12 on client 10 and the application to server 44 in web server 42. The user can be identified from login information required for entering the web site or from IP address or cookie information contained in the HTTP data in network events 50.

The session monitor 46 determines if user profiling is enabled in operation 142. An administrator may configure the session monitor 46 to conduct user profiling for all users, a particular random set of users, for a particular time period, or for any users that reach a particular application state. Other criteria could also be configured into the session monitor 46 for performing user profiling.

User profiling could also be dynamically initiated based on a particular state of the application session or based on a particular user action. For example, user profiling may be enabled whenever a user enters a product purchasing stage in the application session. The product purchasing stage can be identified by the session monitor 46 when the application 12 requests purchasing transaction information from application server 44 or when the application server 44 sends the purchasing transaction information back to the application 12.

If user profiling is enabled, the session monitor 46 starts monitoring user browsing, selection, and/or ordering activities in operation 144. For example, the session monitor 46 may detect what items the user views during the application session, what items have been selected for purchase, when credit card information is entered into field 20B, when the enter button 20C is selected or when the purchases are completed, etc. Other information may also be monitored, such as how much time the user spends selecting different items, what items are initially selected and then unselected, number of aborted purchases, etc.

The session analyzer 60 in operation 146 creates or updates any previously created user profile 62. FIG. 5 shows the server 58 operating the session analyzer 60 and storing captured client events 48, captured network events 50, and user profile 62. However, as explained above, any of the profiling operations and associated profiling data can be to performed and stored in the web server 42 or any other server or computing device connected to network 26.

In this example, the user profile 62 is used for making a decision whether or not to send an incentive to the user. The user profile 62 may track the number of times a particular user accessed the application 12 or selected items for purchasing but then aborted the application session before completing the purchase by clicking on enter button 20C. Any other types of profile information can also be tracked. For example, the user profile 62 may track the number of times a user reentered information into a particular field 20A or 20B. This may indicate a user or application error condition.

The session monitor 46 can use any of the dynamically monitored events described above for generating the user profile 62. For example, the session agent 14 may initially not capture any user events 48. The session monitor 46 may only capture the network events 50 for particular data sent from the application 12, such as data indicating the user selected a product. The session monitor 46 may then send feedback instructions 38 to the session agent 14 to start capturing additional user events 48 or send back previously buffered user events related to the selection and purchasing of the product. For example, the feedback instructions 38 may instruct the session agent 14 to send back cursor movements, keyboard entries, and/or scan images 16 displayed on screen 15 of the client 10. These additional client events 48 can then be used to create or supplement the user profile 62.

The session analyzer 60 in operation 148 determines if the monitored user events 48 and network events 50 exceed any profile thresholds. For example, the user profile 62 may indicate that the user selected items on three different occasions and never purchased any of the selected items. After three aborted purchases, the session analyzer 60 in operation 150 may send a feedback instruction 38 directing the session agent 14 to incentivize the user to complete a purchase. For example, the session analyzer 60 may send an electronic 20% off coupon to the session agent 14. The session agent 14 displays the electronic coupon when the user starts selecting items for a fourth time. The electronic coupon may notify the user that the purchase price will be reduced by 20% if the purchase is completed in the next 10 minutes. This incentive hopefully motivates the user to finally complete an on-line purchase.

Web sites often display electronic coupons on web pages for on-line purchasers. However, the electronic coupons are not dynamically sent to different users according to their particular user profiles as described above.

In operation 152 the session monitor 46 determines if additional profiling is required. If so, additional user browsing, selection, and ordering activities are monitored in operation 144. For example, the session monitor 46 can determine if the electronic coupon resulted in the user purchasing a product. If there was no resulting purchase, the session analyzer 60 in operation 150 may send another incentive to the user, such as a 25% off electronic coupon. If no additional profiling is needed in operation 152, the session monitor 46 returns to operation 140 for analyzing another application session.

This is just one example of almost limitless types of incentives or messages that may be sent to the user. In another embodiment, the feedback instructions 38 could provide on-line help information to the user for navigating through a web session. For example, the captured client events 48 and/or captured network events 50 may indicate a user is having trouble filling in the fields 20A and 20B in screen image 16. Specifically, the network events 50 may indicate that the credit card information entered into field 20B is repeatedly incorrect or rejected by the application server 44. The session monitor 46 may send feedback instructions 38 that direct the session agent 14 to display a help message or on-line chat window in screen image 16. The feedback instructions 38 could also contain the help message that is then displayed in the screen image 16 by the session agent 14.

The feedback instructions could also direct the session agent 14 to send previously captured client events 48 and send any subsequent client events 48 to session monitor 46. The session analyzer 60 could then determine if the credit card use was fraudulent.

Configurable Session Agent

Figure 7:
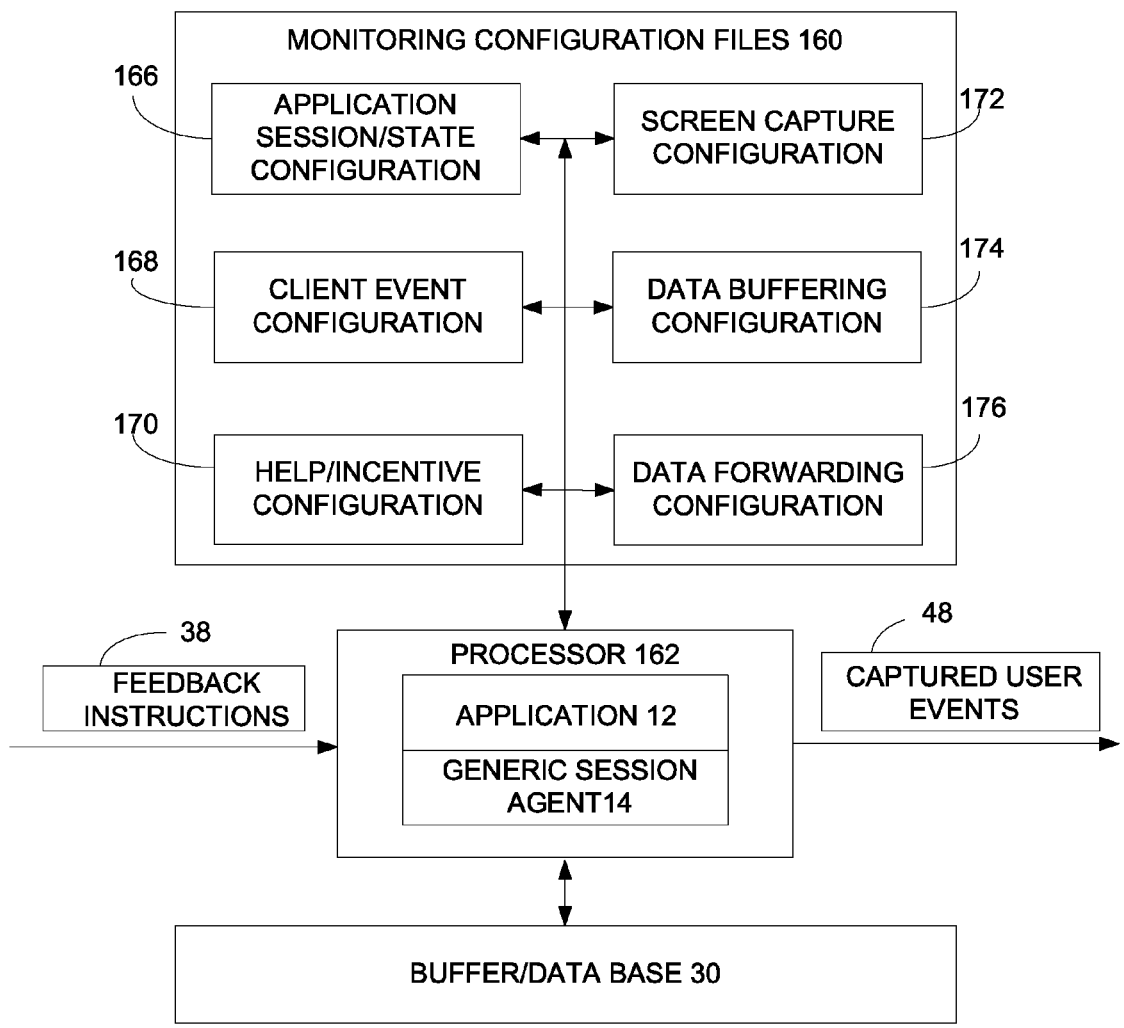
FIG. 7 is a block diagram showing a reconfigurable generic session agent.

FIG. 7 shows another embodiment of the session agent 14 that can be dynamically configured before or during an application session. This generic session agent 14 is software that operates a processor 162 in the client 10 (FIG. 1). The session agent 14 may be loaded onto a client 10 along with the application 12. Alternatively, the session agent 14 can be separately loaded into the client 10 responsive to particular network events 50 received by the session monitor 46 (FIG. 5).

The session agent 14 initially provides a generic capture "skeleton" that can be dynamically configurable to monitor a variety of user events for a variety of different applications. Monitoring configuration files 160 can be loaded into the client along with the generic session agent 14. The monitoring configuration files 160 can contain code or parameters that determine what application sessions and what information from the application sessions are monitored, captured, buffered, and/or forwarded to the session monitor 46.

Multiple configuration files 166-176 are shown in FIG. 7 for illustrative purposes. However, some or all of the configuration information or code could be stored in the same configuration file. The parameters and code in the configuration files 166-176 can be downloaded along with the session agent 14 or can be dynamically loaded and updated by the session monitor 46 via the feedback instructions 38. This prevents having to customize each session agent 14 to a particular application 12. This also allows the session agent 14 to be initially loaded into the client 10 with little or no monitoring and capture functionality and to with little or no significant impact on the performance of the application 12.

An application session/state configuration file 166 identifies which application sessions and application session states to monitor, if any. The session agent 14 may remain in a generic non-capture mode until a particular web session is identified that matches one of the identified applications in configuration file 166. The configuration file 166 can also be configured via the feedback instructions 38 to control what application states in an application session are captured. For example, the configuration file 166 may direct the session agent 14 to capture user events 48 during the product purchase stage of an ecommerce application used for purchasing clothes.

A client event configuration file 168 identifies specific client events 48 that should be captured by the agent 14. For example, the configuration file 168 may direct the session agent 14 to capture all mouse and keyboard entries. In another example, the configuration file 168 may direct the session agent 14 to capture data entered into a particular field, such as field 20A, 20B, and/or 20C in FIG. 5. A help/incentive configuration file 170 directs the session agent 14 to perform help or incentives operations for particular states of particular application sessions as discussed above.

A screen capture configuration file 172 identifies what screen images to capture, what portions of the screen image to capture, and how often the screen image should be captured. A data buffering configuration file 174 indicates what data in the application session to buffer in data base 30 or buffers 32 (FIG. 1) and for how long. For example, the configuration file 174 may direct the session agent 14 to continue to buffer client events 48 for the last minute of the application session. This allows the session monitor 46 to send feedback instruction 38 that may request information from a previous application session state. A data forwarding configuration file 176 indicates what data to forward to the session monitor 46. For example, the configuration file 176 may direct the session agent 14 to only to forward client events 48 to session monitor 46 that have a particular value or that happen during a particular application session state.

Figure 8:
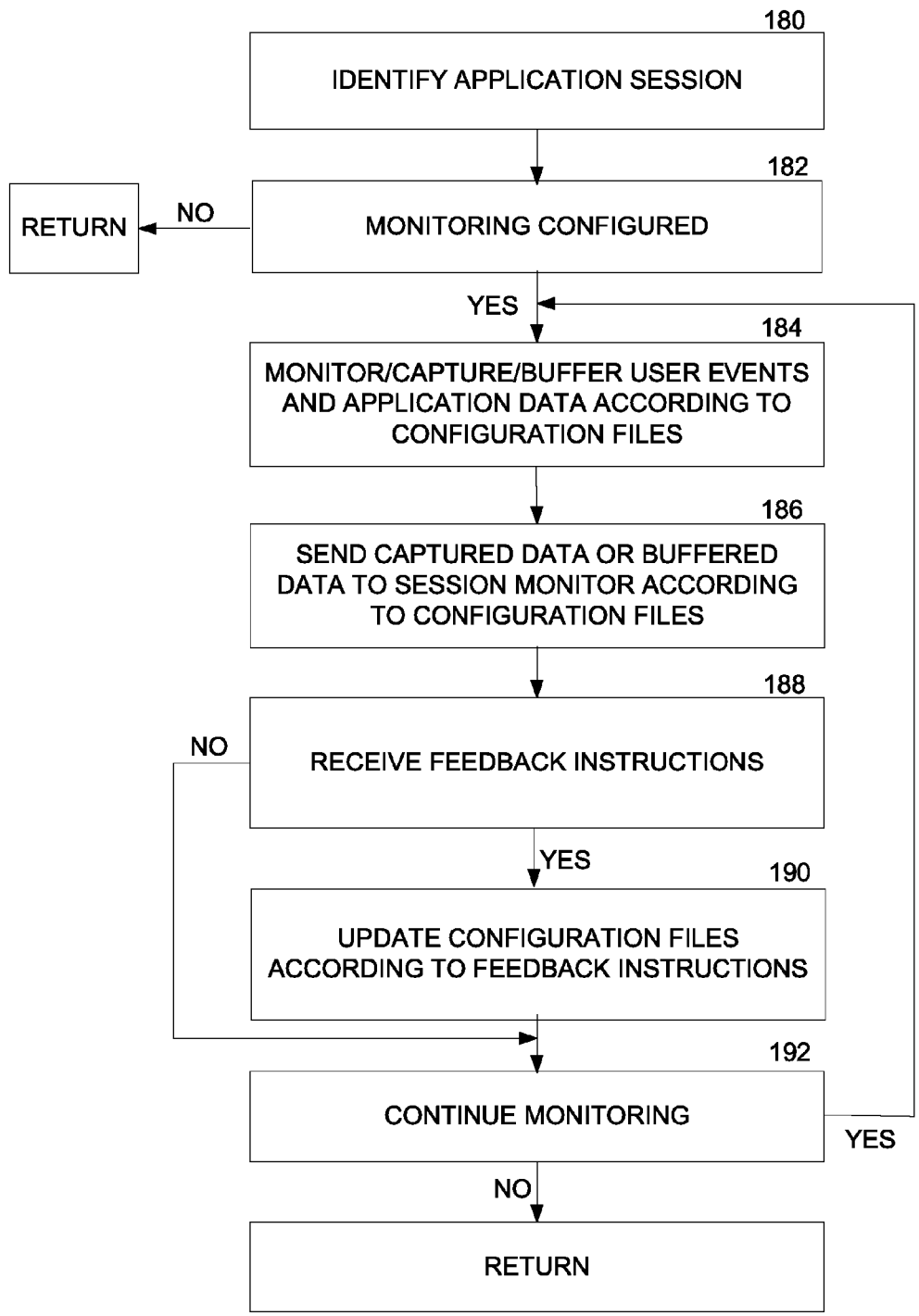
FIG. 8 is a flow diagram showing how the generic session agent of FIG. 7 operates.

FIG. 8 shows in more detail how the session agent 14 in FIG. 7 operates during an application session. Referring to FIGS. 7 and 8, the session agent 14 in operation 180 identifies an application session that has been initiated by a user. The session agent 14 in operation 182 checks the configuration files 160 to determine if any monitoring is configured for the application session. The session agent 14 in operation 184 monitors, captures, and/or buffers user events 48 and any other application data according to the configuration files 160. As explained above, the session agent 14 uses the configuration files 160 to identify what application sessions, application session states, client events, screen images, etc. should be captured and for what users. The configuration files 160 also identify how often particular events or data should be captured, what data should be stored in the local database 30, what data should be sent to the session monitor 46, and what help or incentives should be displayed and when.

The session agent 14 in operation 186 sends any captured or buffered client events to the session monitor 46 according to the configuration files 160. For example, the configuration files 160 may direct the session agent 14 to periodically capture certain client events and scan certain screen images and then store the captured events and screen images in the local client database 30 in FIG. 1. The configuration files 160 may also direct the session agent 14 to send some or all of the captured events and screen images to the session monitor 46 when a specific state of the application session is identified.

The session agent 14 monitors for additional feedback instructions 38 from the session monitor 46 in operation 188. The feedback instructions 38 may direct the session agent 14 in operation 190 to update configuration parameters or code in configuration files 160. Feedback instructions 38 dynamically enable, disable, add, remove, or change the to parameters or code in configuration files 160 that determine how the session agent 14 captures client events 48 according to monitored application session states. If enabled, the session agent 14 in operation 184 continues monitoring, capture, and buffering user events according to the updated configuration files 160 in operation 184. The session agent 14 in operation 186 also sends any captured or previously buffered data to the session monitor 46 according to the updated configuration files 160.

Performance Monitoring

Figure 9:
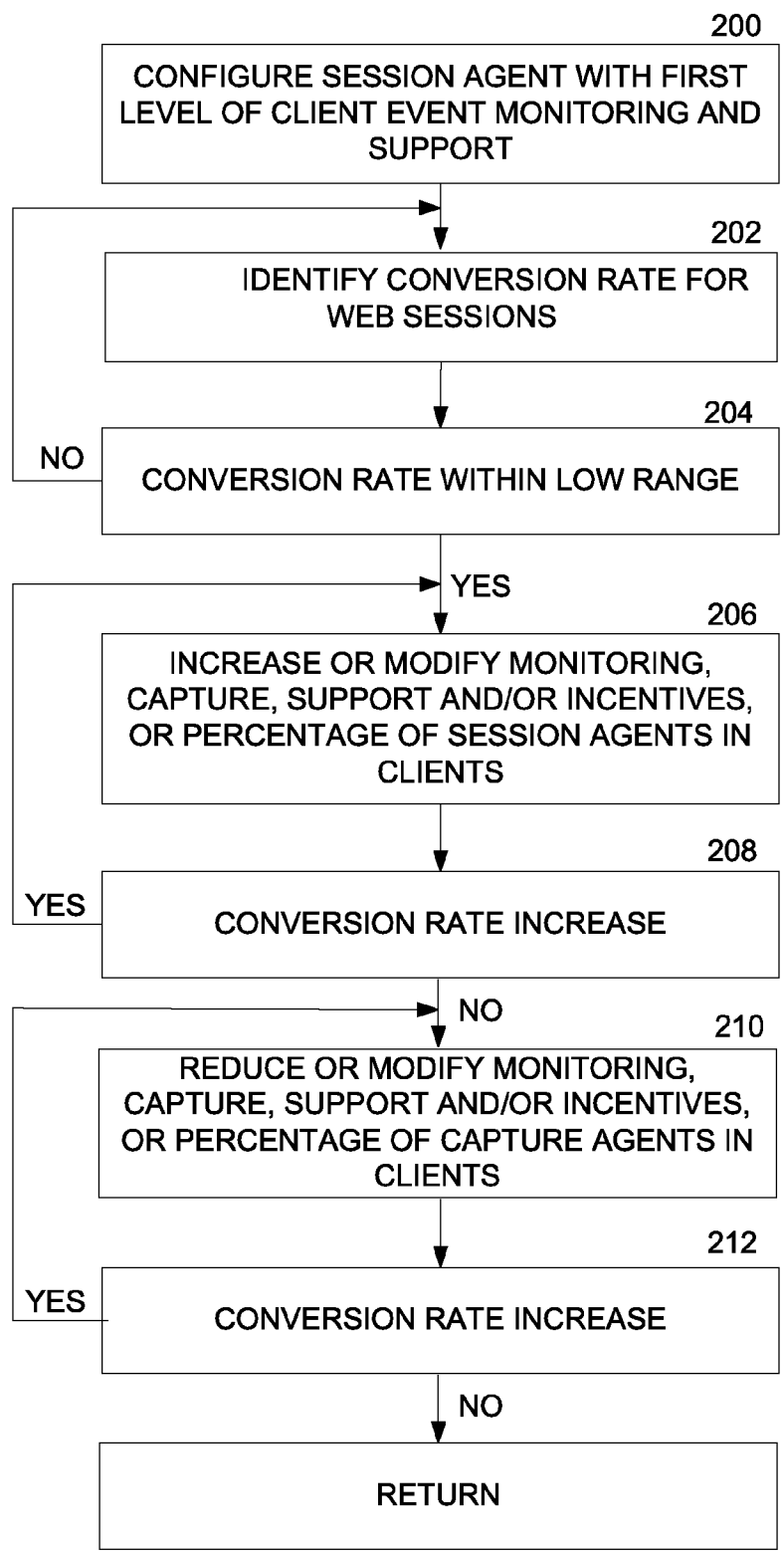
FIG. 9 is a flow diagram showing how monitoring operations are dynamically adjusted according to a conversion rate.

FIG. 9 explains how the session agent 14 can be configured to provide different levels of monitoring and support based on application session performance. In operation 200 the session agent 14 in FIG. 7 is configured with a first level of client event monitoring and application session support. For example, the session monitor 46 may configure the session agent 14 via the configuration files 160 in FIG. 7 to perform little or no monitoring of the application session.

The application session monitor 46 in operation 202 identifies a conversion rate for one or more application sessions based on the network events 50. For example, the session monitor 46 may determine the percentage of particular application sessions that result in the purchase of a product. The session monitor 46 identifies the number of application sessions opened by different users and then through purchase confirmation messages sent in the network events 50 determines the number of those application sessions that result in a product purchase.

The percentage of purchases may be within a first low range in operation 204 indicating a relatively small percentage of application sessions resulted in product purchases. The session monitor 46 in operation 206 may send feedback instructions 38 to the session agent 14 to increase the amount of monitoring, client event capture, support, and/or incentives. For example, the session monitor 46 may send feedback instructions 38 that enable or increase the types or amount of client events 48 that are captured during the web session.

As described above, the session monitor 46 in operation 206 could also send feedback instructions 38 that direct the session agent 14 to provide more on-line support or incentives, such as electronic coupons, to the users during the application sessions. The session monitor 46 in operation 206 could also increase the percentage or number of session agents 14 that are enabled or loaded into clients 10 along with applications 12. For example, initially 10% of applications 12 may be enabled or loaded with session agents 14. The session monitor 46 may increase the number of session agents 14 or number of enabled session agents to 15% if the conversion rate is below some threshold in operation 204.

If the conversation rate increases in operation 208, the session monitor 46 may continue to increase monitoring, capture, support, and/or incentives provided by the session agents 14 or may increase the number of enabled or loaded session agents. For example, the session monitor 46 may identify a conversion rate increase after the session agents 14 start capturing client events 48 for a product checkout page of the application session and then automatically open on-line help sessions whenever it appears the user is delaying or having trouble completing the on-line purchase.

If the conversion rate did not increase in operation 208, the session monitor 46 in operation 210 may send feedback instructions 38 that reduce the number of enabled session agents or reduce the amount of monitoring, capture, support, and/or incentives provided by the session agents 14. If the conversion rate increases in operation 212, the session monitor 46 may send additional instructions to the session agents 14 to further reduce the amount of enabled session agents or reduce the amount of monitoring, capture, support, incentives, etc. provided by the session agents 14. The session monitor 46 may continue to reduce the types to of monitoring, or change the types of monitoring, support, or incentives until the conversion rate stabilizes or increases.

Some conversion rates may increase with more monitoring and support, and other conversion rates may decrease with more monitoring and support. For example, a particular level of monitoring and client event capture may slow down the application session and cause a user to lose interest and abort the application session. The session monitor 46 not only tracks the impact of the session agents 14 and their application session monitoring on application conversion rates, but can also dynamically modify the types and amount of monitoring, event capture, support, and incentives to increase the conversion rate.

Low Impact Application Monitoring

As discussed above, different information can be monitored and includes the server side network activity associated with network events 50. The session agent 14 can be implemented with Application Programming Interface (API) subsystem and programmed to send additional information, such as keyboard entries, mouse movements, and screen shots (bitmaps), back to the application session monitor 46 or application session archive 82. The client events 48 can be diagnostic or analytic in nature. Some of the client events 48 can be automated and are the logical equivalent of DOM events for various Software Developer Kits (SDK's). The server side activity associated with network events 50 is correlated with the instrumented events and screen shots 48 captured locally on the client 10 and allow for real-time eventing, searching, drill down and replay.

As also explained above, the client-side monitoring and capture of the instrumented events and screen-shots 48 can be controlled using server-side feedback instructions 38. For example, during load time of the application 12, the client session agent 14 can contact the application session monitor 46 and query what operations to perform and what events to capture. The session monitor 46 can turn on/off client side monitoring and capture, or can vary what actions are taken or what events are monitored or captured, by the session agent 14 on a per user basis, or a per page/action basis.

One goal of this monitoring strategy is to do the monitoring, capture, and any other operations with the least possible impact on the application 12. However, communication bandwidth and storage are limited on the client 10. The storage constraint is relatively static with generally a predetermined amount of memory 30 and 32 (FIG. 1).

The communication bandwidth limitations can change based on phone location (good signal, bad signal) and whether of not an alternative transport such as a WI-FI connection is available. In addition, communication bandwidth may incur additional cost. For example, client 10 may be a smart phone that operates under a purchased data plan.

As explained above, the session agent 14 may selectively or continuously capture and store client events 48 in local buffer 32 of the client device 10. As network events 50 are captured, a score of "activity" can be generated. In one embodiment, this is done out of band through passive monitoring of the HTTP stream containing network events 50. If the score merits attention, the session monitor 46 directs the session agent 14 to either send the contents of the buffer 32, delete the contents of the buffer 32, or if possible, maintain the contents of buffer 32 for a longer period of time.

The score/decision as to whether or not to send the contents of buffer 32 can be influenced by the particular type and speed of connection currently established with client 10. For example, if the client 10 is currently operating on a relatively slow wireless cell phone connection, session monitor 46 may send feedback instructions 38 directing the session agent 14 to either delete the contents of the buffer 32 try and maintain the contents of the buffer 32 until a higher connection bit rate is established. On the other hand, if the client 10 is currently communicating over to a relatively high hit rate WI-FI connection, the session monitor 46 may send feedback instructions 38 to the session agent 14 to transmit the data in buffer 32 either to web server 46 or session archive 82. Transmitting captured data from the client 10 based on the type or speed of the network connection reduces the likelihood of the monitoring system slowing down the application 12 and application session running on client 10.

Hardware and Software

Several examples have been described above with reference to the accompanying drawings. Various other examples are also possible and practical. The systems and methodologies may be implemented or applied in many different forms and should not be construed as being limited to the examples set forth above. Some systems described above may use dedicated processor systems, micro controllers, programmable logic devices, or microprocessors that perform some or all of the operations. Some of the operations described above may be implemented in software or firmware and other operations may be to implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Digital Processors, Software and Memory Nomenclature

As explained above, embodiments of this disclosure may be implemented in a digital computing system, for example a CPU or similar processor. More specifically, the term "digital computing system," can mean any system that includes at least one digital processor and associated memory, wherein the digital processor can execute instructions or "code" stored in that memory. (The memory may store data as well.)

A digital processor includes, but is not limited to a microprocessor, multi-core processor, Digital Signal Processor (DSP), Graphics Processing Unit (GPU), processor array, network processor, etc. A digital processor (or many of them) may be embedded into an integrated circuit. In other arrangements, one or more processors may be deployed on a circuit board (motherboard, daughter board, rack blade, etc.). Embodiments of the present disclosure may be variously implemented in a variety of systems such as those just mentioned and others that may be developed in the future. In a presently preferred embodiment, the disclosed methods may be implemented in software stored in memory, further defined below.

Digital memory, further explained below, may be integrated together with a processor, for example Random Access Memory (RAM) or FLASH memory embedded in an integrated circuit Central Processing Unit (CPU), network processor or the like. In other examples, the memory comprises a physically separate device, such as an external disk drive, storage array, or portable FLASH device. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such a conventional rotating disk drive. All such memories are "machine to readable" in that they are readable by a compatible digital processor. Many interfaces and protocols for data transfers (data here includes software) between processors and memory are well known, standardized and documented elsewhere, so they are not enumerated here.

Storage of Computer Programs

As noted, some embodiments may be implemented or embodied in computer software (also known as a "computer program" or "code"; we use these terms interchangeably). Programs, or code, are most useful when stored in a digital memory that can be read by one or more digital processors. The term "computer-readable storage medium" (or alternatively, "machine-readable storage medium") includes all of the foregoing types of memory, as well as new technologies that may arise in the future, as long as they are capable of storing digital information in the nature of a computer program or other data, at least temporarily, in such a manner that the stored information can be "read" by an appropriate digital processor. The term "computer-readable" is not intended to limit the phrase to the historical usage of "computer" to imply a complete mainframe, mini-computer, desktop or even laptop computer. Rather, the term refers to a storage medium readable by a digital processor or any digital computing system as broadly defined above. Such media may be any available media that is locally and/or remotely accessible by a computer or processor, and it includes both volatile and nonvolatile media, removable and non-removable media, embedded or discrete.

Having described and illustrated a particular example system, it should be apparent that other systems may be modified in arrangement and detail without departing from the principles described above. Claim is made to all modifications and variations coming within the spirit and scope of the following claims.

The invention claimed is:

1. A computing device, comprising:
a processor configured to:
modify operating parameters or code in a configuration file according to feedback instructions received from a session monitor during an application session; and
capture client events during the application session according to the operating parameters or code in the configuration file.

2. The computing device according to claim 1, wherein the configuration file identifies the client events to capture for different states of the application session.

3. The computing device of claim 1, wherein:
the operating parameters or code comprise support operations configured to assist a user during different states of the application session;
the feedback instructions are configured to identify the different states of the application session; and
the processor is configured to execute the support operations in response to the different states of the application session identified in the feedback instructions.

4. The computing device of claim 1, wherein:
the feedback instructions identify incentives associated with application session transactions, and
the processor is configured to present the incentives to a user in response to identifying the application session transactions during the application session.

5. The computing device of claim 1, wherein the configuration file identifies what application sessions to capture, what application states to capture, what client events to capture, what screen images to capture, what client events from the application session to buffer, and what client events to forward to a session monitor.

6. The computing device of claim 1, wherein the processor is configured to vary an amount of client events captured during the application session based on a transaction completion rate associated with the application session.

7. The computing device of claim 1, wherein the processor is further configured to store the client events in a local buffer and send, delete, or maintain the client events in the local buffer based on a communication bandwidth available for transmitting the client events to the session monitor.

8. A method, comprising:
storing, by a computing device, a configuration file;
detecting, by the computing device, an application session associated with in the configuration file;
varying an amount if the client events captured during the application session based on a transaction completion rate associated with the application session; and
forwarding, by the computing device, the client events to a session monitoring server.

9. The method of claim 8, further comprising:
identifying, by the computing device, feedback instructions in the configuration file for assisting a user during different states of the application session;
monitoring, by the computing device, the different states of the application session; and
displaying, by the computing device, the feedback instructions based on the different states of the application session.

10. The method of claim 9, further comprising:
identifying, by the computing device, incentives in the feedback instructions; and
displaying, by the computing device, the incentives based on the different states of the application session.

11. The method of claim 8, wherein the configuration file identifies what application sessions to capture, what client events to capture within the application sessions, what screen images to capture from the application sessions, what client events from the application sessions to buffer, and what client events from the application sessions to forward to the session monitoring server.

12. The method of claim 8, further comprising storing the client events in a local buffer based on operating parameters stored in the configuration file.

13. The method of claim 8, further comprising capturing the client events for periods of time based on operating parameters stored in the configuration file.

14. A computer program product comprising a non-transitory computer readable storage medium having program code embodied wherewith, the program code readable/executable by a computer to perform a method comprising:
    storing a configuration file identifying client events associated with web sessions;
    storing buffering parameters in the configuration file;
    identifying the web sessions operating on the computer;
    identifying the client events identified in the configuration file executing on the computer during the web sessions;
    capturing the client events;
    buffering the client events based on the buffering parameters; and
    sending the client events to a session monitor.

15. The computer program product of claim 14, further comprising:
    storing screen location parameters in the configuration file; and
    capturing the client events based on the screen location parameters.

16. The computer program product of claim 14, further comprising:
    storing forwarding parameters in the configuration file; and
    sending the client events to the session monitor based on the forwarding parameters.

17. The computer program product of claim 14, further comprising:
    storing time parameters in the configuration file; and
    capturing the client events for periods of time based on the time parameters.

* * * * *